June 5, 1934.　　J. A. A. DE VIZCAYA　　1,961,205
AUTOMOBILE BODY
Filed Oct. 29, 1932
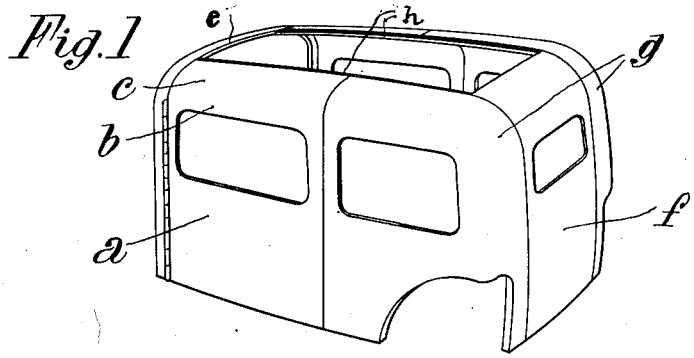
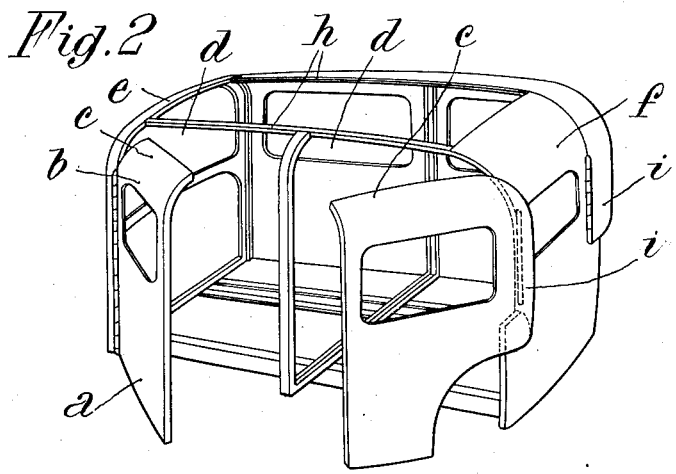
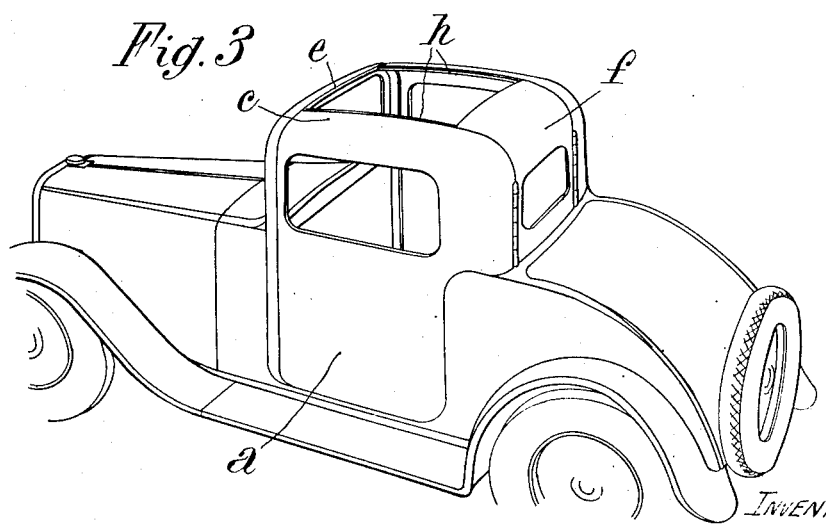
INVENTOR:
JEAN ANTOINE AUGUSTIN DE VIZCAYA,
DEC'D, BY HENRI LUCIEN LEON JOHANEI,
ADMR.
by Louis Barnett
Attorney.

Patented June 5, 1934

1,961,205

UNITED STATES PATENT OFFICE 1,961,205

AUTOMOBILE BODY

Jean Antoine Augustin de Vizcaya, deceased, late of Chaville, France, by Henri Lucien Léon Johanet, administrator, Versailles, France Application October 29, 1932, Serial No. 640,309 In Belgium November 4, 1931

4 Claims. (Cl. 296—28)

The present invention relates to automobile bodies and, more particularly, to those designed to be made up of aluminium and other light metal alloys.

In light metal automobile bodies as at present manufactured, it is usual to provide an upper door frame portion designated in French engineering practice by the term "pavillon". This portion of the door frame or frames is one of the most costly to manufacture.

One of the objects of the present invention is to provide a light metal body wherein the pavillon or upper portion of the door frame is entirely eliminated.

Another object is to provide a form of light metal body of simplified construction wherein the doors sweep through a smaller space than those now in use.

Further objects will appear in the course of the detailed description now to be given with reference to the accompanying drawing, in which:

Figure 1 represents, in perspective, a two-door form of closed body showing one illustrative embodiment of the invention;

Figure 2 is a similar perspective showing a four door body type; while

Figure 3 shows, in perspective, the invention applied to a cabriolet.

Referring to Figure 1 of the drawing there is shown a body assembly composed of a pair of lateral doors $a$ hingedly supported on a front or wind shield portion $e$, the upper portion of door $a$ being bent to form a curved surface $b$ which is continued by a similar surface $c$ forming a portion of what is normally the roof. The hinges supporting door $a$ may be vertical or slightly inclined. Portions $b$ and $c$ replace what is usually the "pavillon" in ordinary bodies. A rear section $f$ having an upper bent portion similar to $b$, $c$ is suitably supported and coacts with a pair of lateral fixed sections $g$, $g$ having upper bent portions in line with $b$ $c$ and a similar rear bent portion as shown in Figure 1. A suitable skeleton $h$ (see also Figure 2) may be mounted to extend from windshield portion $e$ backward along the inner, upper edges of elements $a$ and $g$ and along the line of junction of elements $g$ and $f$. If it be desired to close the body assembly, a roof section is mounted to straddle elements $h$, $h$ or is directly connected to elements $f$ and $g$, or a water tight fabric is stretched across the roof opening. In order to prevent leakage between the free edges of portions $c$ and the roof, the latter or elements $h$ are provided with shallow gutters for carrying off rain.

The assembly shown in Figure 2 differs from the one just described only in that lateral sections $g$, $g$ are replaced by a pair of doors of similar form provided with upper bent portions $c$ and rear bent portions $i$, the latter being hingedly supported on rear section $f$. It will be noted that when the rear doors are so designed with the hinges displaced inwardly, they sweep through a smaller space when opening outwardly. To convert a body of the type shown in Figure 2 into one shown in Figure 1, it is only necessary to rigidly lock the rear doors in closed position.

Figure 3 shows the invention applied to a cabriolet. A glance at the drawing will make it evident that the same principles enter into the design of this form of body as in the case of the assemblies illustrated in Figures 1 and 2. It will be noted however, the lower portion of doors $a$ are made somewhat narrower so as to form a recessed or cut away portion which will clear the rear mud guards when the doors are opened.

The invention is not to be taken as limited to the particular structures shown in the drawing, thus: rear section $f$, instead of terminating as shown in the various figures may be elongated at its upper horizontal portion so as to cover the entire roof and so constitute what may be termed the postero-superior part of the body; the uprights shown in Figure 2 between the doors may be eliminated entirely as also longitudinal elements $h$; rear section $f$ may have substantially straight edges as shown in Figure 1 or recessed lateral edges as in Figure 2; the inside of the body may be lined or upholstered in any way desired; the joints between the roof and the doors may be rendered water tight in any one of a number of ways which will be evident to those skilled in the art.

Bodies designed as above described permit elimination of the costly "pavillon" portion, are free from jamming along the upper edge when the upper portion of the door frame deforms, it can be struck out of single thicknesses of light metal in standard, easily assembled sizes and shapes, and enlarges the effective door frame section.

What is claimed is:—

1. In a motor vehicle body, a pair of lateral doors mounted to swing toward one another, a fixed rear section forming part of the rear body wall, and means for hingedly supporting the rear edges of said pair of lateral doors on said rear section on an axis lying inside the plane of the lateral surfaces of said doors.

2. In a motor vehicle body, a front section situated adjacent the motor, a rear section positioned in posterior spaced relation to said front section, a pair of front doors hingedly supported on said front section, and a pair of rear doors hingedly supported on said rear section, the axis of rotation of said rear doors being positioned inside the plane of the lateral surfaces of said front and rear doors.

3. In a motor vehicle body, a front section positioned adjacent the motor, a fixed rear section of lesser width than said front section, a pair of doors hingedly supported on said rear section, said doors including upper round extremities integral with the rest of the door and extending inward to form the lateral portions of what is normally the vehicle roof, said doors also including rounded rear portions integral with the rest of the door and extending inward to form the lateral portions of what is normally the rear wall of the vehicle.

4. In a motor vehicle body, a front section positioned adjacent the motor, a fixed rear section having portions thereof of lesser width than said front section, a pair of front doors hingedly supported on said front section and including an upper bent portion integral with the rest of the door and forming the lateral portions of what is normally the roof, and a pair of rear doors hingedly supported on said rear section and including upper extremities bent to lie in line with the upper extremities of said front doors, said rear doors also including rear portions bent inward to form the lateral portions of what is normally the rear wall of the vehicle.

HENRI LUCIEN LÉON JOHANET
*Administrator of Jean Antoine Augustin Vizcaya, Deceased.*